United States Patent
Park et al.

(10) Patent No.: US 11,775,026 B1
(45) Date of Patent: Oct. 3, 2023

(54) MOBILE DEVICE FOLD DETECTION

(71) Applicant: QUALCOMM Incorporated, San Diego, CA (US)

(72) Inventors: Donghyun Park, Yongin-si (KR); Woosung Jeong, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/816,695

(22) Filed: Aug. 1, 2022

(51) Int. Cl.
G09G 5/00 (2006.01)
G06F 1/16 (2006.01)

(52) U.S. Cl.
CPC .......... G06F 1/1677 (2013.01); G06F 1/1686 (2013.01); *G06F 1/1652* (2013.01)

(58) Field of Classification Search
CPC .... G06F 1/1641; G06F 1/1652; G06F 1/1677; G06F 2203/04102; G09F 9/301; G09G 2380/02
See application file for complete search history.

(56) References Cited

U.S. PATENT DOCUMENTS

| | | | | |
|---|---|---|---|---|
| 8,836,611 B2* | 9/2014 | Kilpatrick | ............ | G06F 1/1654 |
| | | | | 345/38 |
| 9,753,495 B2* | 9/2017 | Matsumoto | ........... | G06F 3/0412 |
| 2006/0162122 A1* | 7/2006 | Satoh | ..................... | G06F 1/162 |
| | | | | 343/702 |
| 2015/0035777 A1* | 2/2015 | Hirakata | ............... | G06F 3/0412 |
| | | | | 345/173 |
| 2015/0103023 A1* | 4/2015 | Iwaki | .................... | G06F 1/1615 |
| | | | | 345/173 |

* cited by examiner

*Primary Examiner* — Joe H Cheng
(74) *Attorney, Agent, or Firm* — The Marbury Law Group, PLLC

(57) ABSTRACT

Various embodiments may include methods of detecting a fold state of a foldable mobile device in which the foldable mobile device includes a hinge coupling the first and second faces pivotally to fold into one or more fold states based on images of a visual element obtained by an image sensor. Embodiments may include measuring, using an image sensor disposed on a first face of the foldable mobile device, a predetermined feature on a second face of the foldable mobile device, and determining a fold state of the foldable mobile device based on the measure of the predetermined feature. In some embodiments, the reported fold state may be based on a dimension determined from the measure of the predetermined feature.

27 Claims, 10 Drawing Sheets

 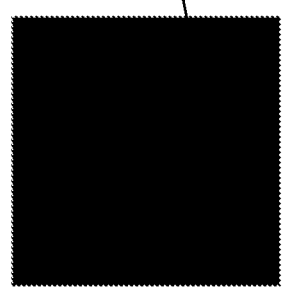
FIG. 3A　　　　　　　　FIG. 3B
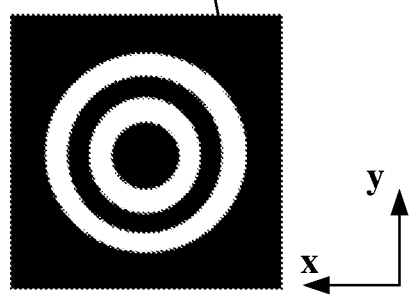 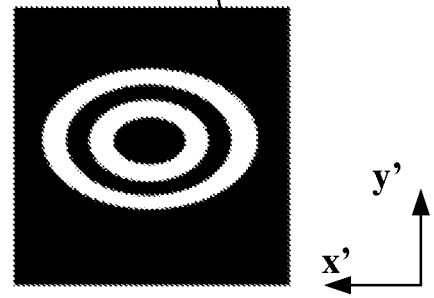
FIG. 4A　　　　　　　　FIG. 4B

MOBILE DEVICE FOLD DETECTION

BACKGROUND

Foldable mobile devices, like smartphones, tablets, and laptops, detect a state of folding of the device using Hall effect integrated circuits with magnets or other hinge sensors. However, the inclusion of such circuits and/or magnets to provide a fold detection feature increases the costs and functional life of such foldable mobile devices

SUMMARY

Various aspects include methods for detecting a fold state of a foldable mobile device. In various aspects, a foldable mobile device may include a hinge coupling a first face and a second face pivotally to enable the mobile device to fold into one or more fold states. Various aspects may include measuring, using an image sensor disposed on the first face of the foldable mobile device, a predetermined feature on a second face of the foldable mobile device, in which the fold states include a closed state in which the first and second faces face one another and an open state in which the first and second faces at least partially face away from one another, and reporting, by a processor of the foldable mobile device, a fold state of the foldable mobile device based on the measure of the predetermined feature. In some aspects, the reported fold state may be based on a dimension determined from the measure of the predetermined feature. In some aspects, the predetermined feature may be generated by a display on the second face. In some aspects, the predetermined feature may be an element on a status bar of a display on the second face. In some aspects, the predetermined feature may not be visible to the naked eye.

In some aspects, a measure of the predetermined feature determined from the measuring thereof may correspond to a fold angle between the first and second faces. In some aspects, reporting the fold state of the foldable mobile device based on the measure of the predetermined feature may include reporting the fold state as ajar in response to the fold angle being greater than zero and less than a low angular threshold. In some aspects, reporting the fold state of the foldable mobile device based on the measure of the predetermined feature may include reporting the fold state as open in response to the fold angle being greater than a low angular threshold greater than zero.

In some aspects, measuring the predetermined feature may include measuring a first predetermined feature for a first range of fold angles between the first and second faces and measuring a second predetermined feature for a second range of fold angles between the first and second faces. Some aspects may further include measuring another predetermined feature on a third face of the foldable mobile device, in which reporting the fold state of the foldable mobile device may be based on at least one of a measure of the predetermined feature or a measure of the other predetermined feature.

Further aspects may include a processor for use in a mobile device configured to perform operations of any of the methods summarized above. Further aspects may include a mobile device including means for performing functions of any of the methods summarized above. Further aspects may include a mobile device configured with processor-executable instructions to perform operations of any of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

FIG. 3A is a plan view of a predetermined feature according to some embodiments.

FIG. 3B is a plan view of a visualization of the predetermined feature in FIG. 3A from the perspective of an image sensor of the foldable mobile device in a closed or folded state according to some embodiments.

FIG. 4A is a plan view of a predetermined feature according to some embodiments.

FIG. 4B is a plan view of a visualization of the predetermined feature in FIG. 4A from the perspective of an image sensor of the foldable mobile device in a partially open fold state according to some embodiments.

DETAILED DESCRIPTION

Figure 1A:
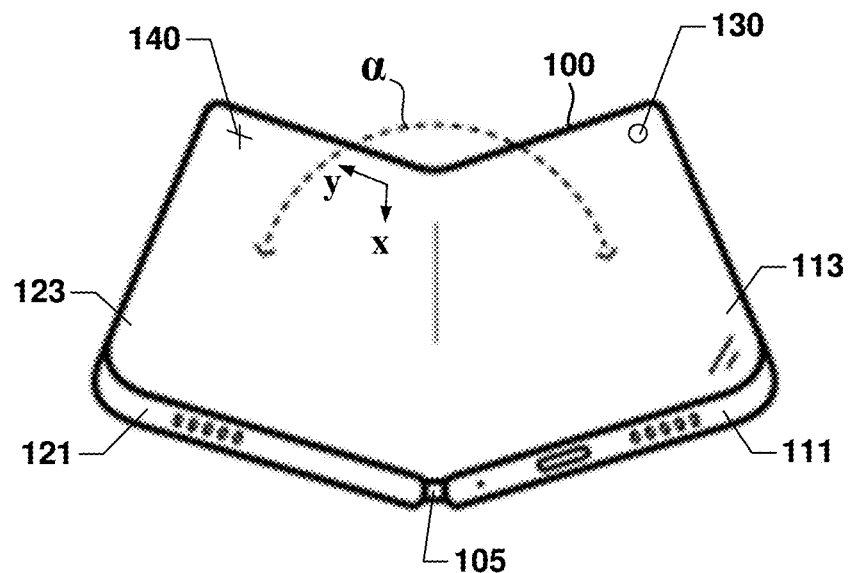
FIG. 1A is a perspective view of a foldable mobile device according to some embodiments.

Various embodiments will be described in detail with reference to the accompanying drawings. Wherever possible, the same reference numbers will be used throughout the drawings to refer to the same or like parts. References made to particular examples and embodiments are for illustrative purposes and are not intended to limit the scope of the claims.

Various embodiments include a foldable mobile device configured to detect a fold state of the foldable mobile device using an image sensor (e.g., a camera). The foldable mobile device may include a hinge pivotally coupling first and second faces to fold into one or more fold states. The fold states may include a closed state in which the first and second faces face one another and an open state in which the first and second faces at least partially face away from one another. The foldable mobile device may include an image sensor (e.g., a camera) configured to detect and/or measure a predetermined feature on an opposing face of the foldable mobile device. If the predetermined feature is detected, the foldable mobile device processor may determine that the device is in an open or partially open state. A dimensional measurement or processing of an image of the predetermined feature may be used by the device processor to determine the extent to which the foldable mobile device is open. In contrast, if the feature is not detected, the foldable mobile device may be in either a closed state or a wide-open state.

As used herein, the term "foldable mobile device" refers to an electronic device equipped with at least two panels coupled by a hinge that enables at least two of the panels to pivot relative to one another about the hinge. The foldable mobile device includes at least a processor, memory, and a device for reporting a fold state of the foldable mobile device. The panels of the foldable mobile device may or may not have displays.

In some embodiments, a foldable mobile device may include wireless communication devices such as a transceiver and antenna configured to communicate with wireless communication networks. A foldable mobile device may include any one or all of cellular telephones, smartphones, portable computing devices, smart glasses, personal or mobile multimedia players, laptop computers, tablet computers, 2-in-1 laptop/table computers, smart books, ultrabooks, multimedia Internet-enabled cellular telephones, entertainment devices (e.g., wireless gaming controllers, music and video players, satellite radios, etc.), smart furniture such as a smart bed or smart sofa, smart exercise equipment, Internet of Things (IoT) devices, augmented/virtual reality devices, and similar electronic devices that include a memory, wireless communication components and a programmable processor. In some embodiments, a foldable mobile device may be wearable device by a person. As used herein, the term "smart" in conjunction with a device, refers to a device that includes a processor for automatic operation, for collecting and/or processing of data, and/or may be programmed to perform all or a portion of the operations described with regard to various embodiments.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "component," "system," "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Figure 1B:
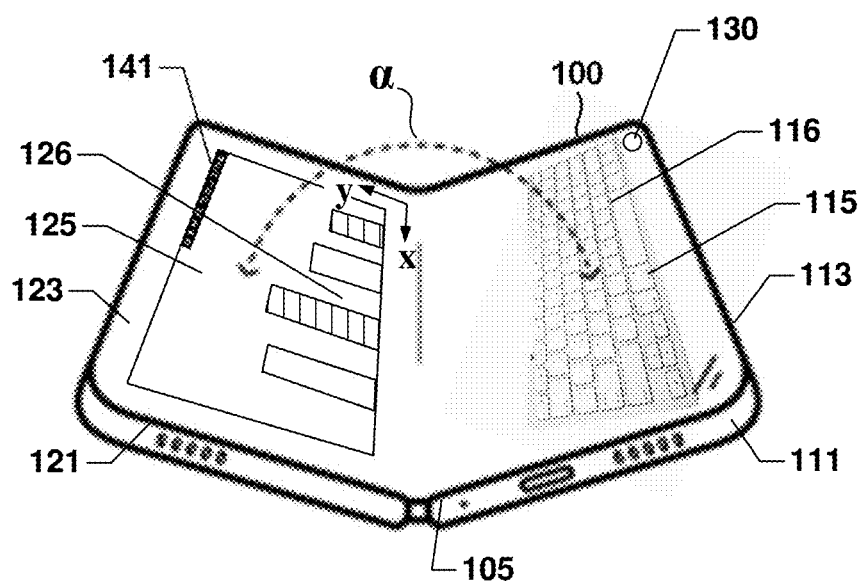
FIG. 1B is a perspective view of the foldable mobile device of FIG. 1A with display elements according to some embodiments.

FIGS. 1A and 1B illustrate a foldable mobile device 100 configured to detect a fold state thereof, according to some embodiments. With reference to FIGS. 1A and 1B, the foldable mobile device 100 is illustrated in an open state (i.e., unfolded) may include a hinge 105 pivotally coupling a first panel 111 and a second panel 121 to fold into one or more fold states. The first panel 111 includes a first face 113 on one side of the first panel 111. Similarly, the second panel 121 may include a second face 123 on one side of the second panel 121. The hinge 105 may be any type of movable joint or mechanism on which one or both panels 111, 121 swing as the foldable mobile device 100 opens and closes. In this way, the first and second panels 111, 121 may be two separate components joined by the hinge 105. Alternatively, the first and second panels 111, 121 may be one continuous panel configured to bend and/or fold in a region, such as along the line corresponding to the hinge 105.

In FIGS. 1A and 1B, the foldable mobile device 100 is illustrated in an open state (i.e., unfolded). However, pivoting the first and second panels 111, 121 changes the fold state of the foldable mobile device 100. The fold states include a closed state in which the first and second panels 111, 121 abut one another along the respective first and second faces 113, 123. Thus, in the closed state, the first and second faces 113, 123 of the first and second panels 111, 121 directly face toward one another. As the first and second panels 111, 121 are pivoted relative to one another from the closed state, the foldable mobile device 100 starts opening into one or more open states. In the open states, the first and second faces 113, 123 either face at least partially away from one another (i.e., closer to the closed state) or completely away from one another (i.e., further from the closed state). As the first and second panels 111, 121 unfold from the closed state, a fold angle α is defined between the first and second faces 113, 123. The greater the fold angle α, the greater the open state.

In accordance with various embodiments, at least one of the first and second panels 111, 121 may include an image sensor 130 (e.g., a camera), which may be located on one of the first and second faces 113, 123 (e.g., on the first face 113). In addition, on at least one of the other of the first and second faces (e.g., the second face 123), the foldable mobile device 100 may have or be configured to display one or more predetermined features 140, 141. In FIG. 1A the first predetermined feature 140 is illustrated as a plus (+) symbol, while in FIG. 1B the second predetermined feature 141 is at least one element of a status bar. Each of the first and second predetermined features 140, 141 may be a symbol (e.g., dot, circle, square, cross, special character), a series or pattern of symbols, an encoded mark (e.g., QR code, bar code), a watermark, an image, part of an image, or other predetermined element the size of which may be measured remotely.

The first and/or second predetermined feature 140, 141 may be a fixed element of the surface upon which that first and/or second predetermined feature 140, 141 is located. The first predetermined feature 140, in FIG. 1A, illustrates an example of how a predetermined feature may be formed on a surface. For example, the plus symbol ("+") may be a permanent element, such as by printing, etching, embossing, etc. onto the second face 123. Alternatively, the first predetermined feature 140 may be generated as part of a display screen, such as on a display forming the second face 123. In some embodiments, the predetermined feature may not be visible to the naked eye (e.g., presented outside a visible spectrum of light or using high frequency imaging). As used herein, the expression "naked eye", which may also be called the bare eye or unaided eye, is the practice of engaging in visual perception unaided by a magnifying, light-collecting optical instrument, such as a telescope or microscope, or eye protection. Vision corrected to normal acuity using corrective lenses is still considered "naked."

FIG. 1B illustrates another example of how a predetermined feature may be formed on a surface in the form of a second predetermined feature 141. The second predetermined feature 141, in the form of a status bar, may be generated on a display 125 that is part of the second face 123. The foldable mobile device 100 may include more than one display. For example, the first panel 111 may include a first display 115 (e.g., a touch-screen display), which may include features like a virtual keyboard 116. The second panel 121 may include a second display 125, which may be used to generate the first and/or second predetermined features 140, 141, as well as other screen display elements 126.

Using the image sensor 130, a processor of the foldable mobile device 100 may measure a characteristic of the one or more predetermined features 140, 141 in order to determine the fold angle α of the foldable mobile device 100. The fold angle α may be defined by the angle formed between the first and second faces 113, 123 of the first and second panels 111, 121. When the first and second panels 111, 121 are folded over onto one another, which corresponds to a closed or folded state, the fold angle α may be zero or approximately zero. As the first and second panels 111, 121 are pivoted open, the fold angle α will increase.

The fold angle α may be determined from the observable change in angle of the one or more predetermined features 140, 141 from the perspective of the image sensor 130. For example, using the x-y axis shown in FIG. 1A for reference, an observable dimension of the predetermined feature 140 (i.e., the "+" sign) along the y-axis will get shorter from the perspective of the image sensor 130 as the fold angle α increases. In contrast, as the fold angle α decreases, an observable dimension of the predetermined feature 140 along the y-axis will get longer.

Similarly as illustrated in FIG. 1B, using a similar x-y axis, an observable dimension of the second predetermined feature 141 (i.e., a status bar) along the y-axis will get shorter from the perspective of the image sensor 130 as the fold angle α increases. In contrast, as the fold angle α decreases, an observable dimension of the second predetermined feature 141 along the y-axis will get longer. Thus, an observable length of the second predetermined feature 141 is inversely proportional to the fold angle α.

Observable characteristics of the predetermined features 140, 141, such as a known dimension along a single axis (e.g., a length along the y-axis), may be used to calculate the fold angle α based on the observable length of that known dimension at any given time. A conversion from observable length to determined fold angle α may performed using a look-up table and/or formula. A processor of the foldable mobile device 100 may use the image sensor to measure the predetermined feature 140 and determine the fold angle α at regular intervals, continuously, at select times, or in accordance with some other timing or trigger In accordance with various embodiments, the image sensor 130 may be activated for measuring one or more of the predetermined features 140, 141. The processor may activate the image sensor 130 periodically in response to a triggering event (e.g., a sensor detects movement in at least one panel 111, 121), or based on other events/factors. The processor may receive one or more images collected by the image sensor 130 of the predetermined feature(s) 140, 141. The processor may compare the collected image(s) to one or more stored images of the corresponding predetermined feature(s) 140, 141 to determine a dimensional difference of the collected image. If the dimensions are not the same, the processor may deduce that the foldable mobile device 100 is open (i.e., not closed). Additionally, the processor may measure the difference between the known dimension of the predetermined feature and the observed dimension of the visual representation of the predetermined feature in order to determine the fold angle corresponding to that measurement.

In some embodiments, more than one predetermined feature 140, 141 may be displayed and used to better detect certain fold angles. For example, the first predetermined feature 140 may be more clearly visible and more accurately measured for fold angles of 30 degrees or less, but the second predetermined feature 141 may be more clearly visible and more accurately measured for fold angles above 30 degrees. The use of two different predetermined features 140, 141 may also allow the foldable mobile device 100 to use display elements that are already typically displayed when the foldable mobile device 100 is in that configuration.

In an example implementation, in the closed state the image sensor may lie opposite a logo or other fixed element of the foldable mobile device 100 that may be measured.

Once the foldable mobile device 100 is opened beyond a certain point (e.g., a 30 degree fold angle) that logo or other fixed element may not be as clearly visible or other display elements may be preferred for measurements. In this way, measuring the predetermined feature may measure a first predetermined feature (e.g., 140) for a first range of fold angles (e.g., $\alpha \le 30°$) between the first and second faces and measures a second predetermined feature (e.g., 141) for a second range of angles (e.g., $\alpha > 30°$) between the first and second faces.

In various embodiments, once a fold angle $\alpha$ and/or thus a fold state are determined, the processor may report the fold state of the foldable mobile device 100 based on the measure of the predetermined feature 140, 141. Additionally, the processor may report the determined fold angle. Reporting the fold state may include saving data reflecting the fold state into memory. Additionally, or alternatively, reporting the fold state may include automatically activating an operational feature of the foldable mobile device. For example, in response to a partially open fold state being detected, the processor may wake the foldable mobile device 100 from a sleep state. As another example, in response to determining a fully open fold state (i.e., the first and second faces 113, 123 are facing or almost facing in the same direction), the processor may present a tablet-mode the displays (e.g., 115, 125) in which both displays work together as one continuous larger display. As a further example, in response to determining a particular fold state, the processor may launch a particular application configured to launch when that particular fold state is detected.

Figure 2A:
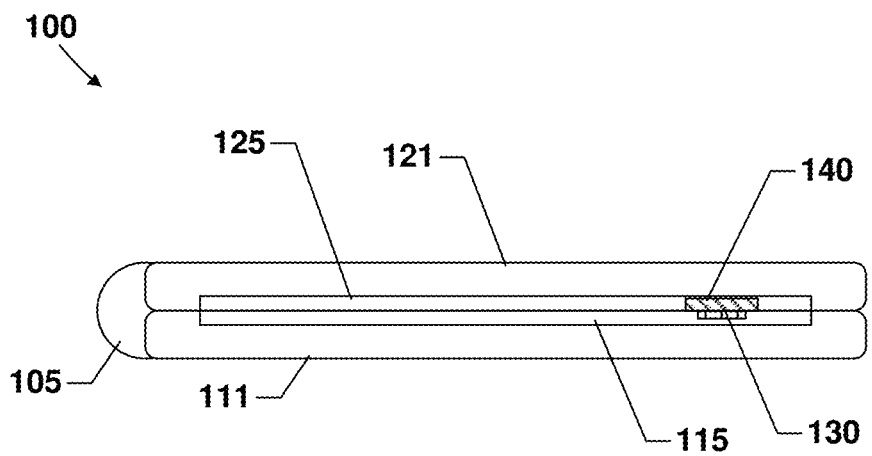
FIG. 2A is a side view of a foldable mobile device in a closed or folded state, according to some embodiments.
Figure 2B:
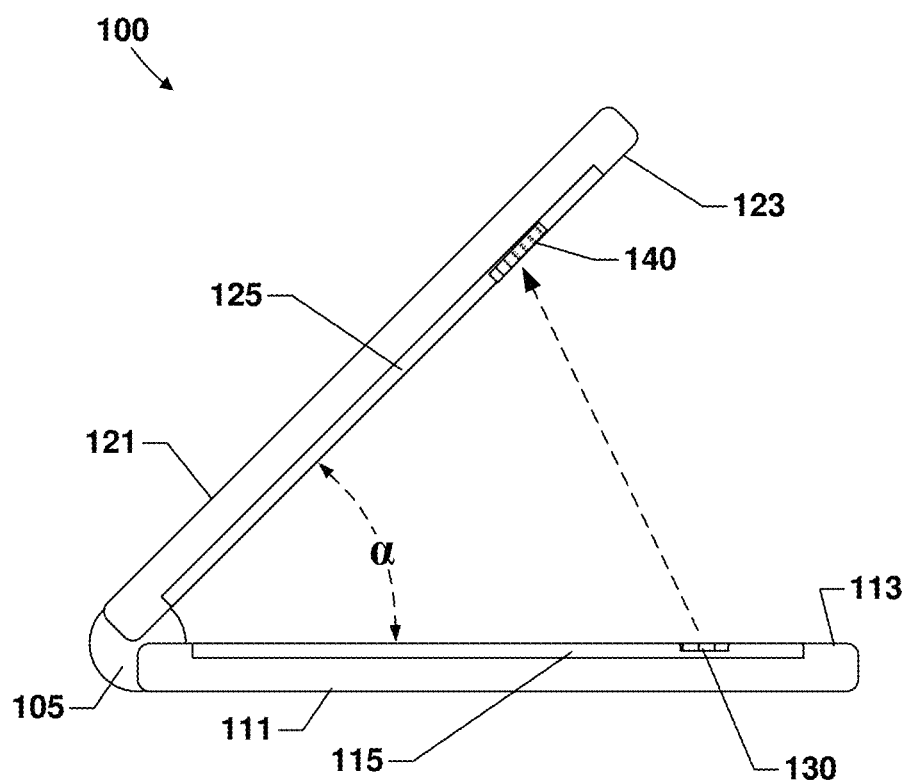
FIG. 2B is a side view of a foldable mobile device in a partially open fold state, according to some embodiments according to some embodiments.
Figure 2C:
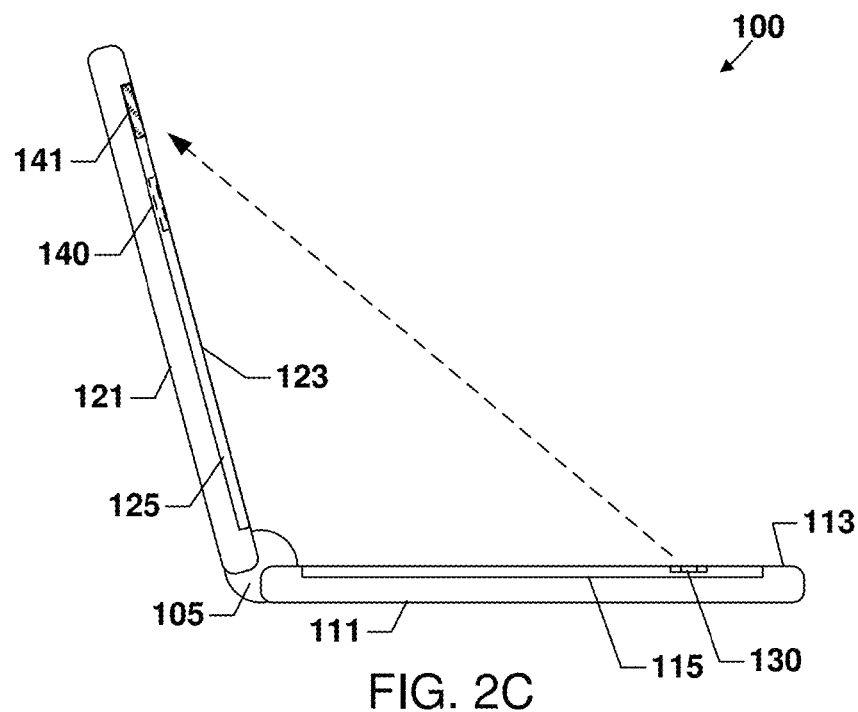
FIG. 2C is a side view of a foldable mobile device in a wide open fold state, according to some embodiments according to some embodiments.
Figure 2D:
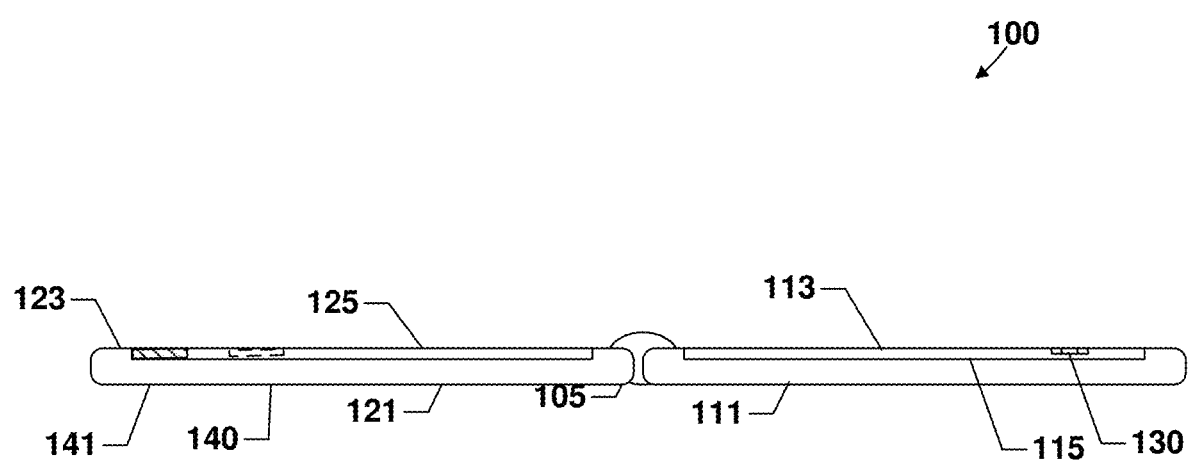
FIG. 2D is a side view of a foldable mobile device in a fully open fold state, according to some embodiments according to some embodiments.

FIGS. 2A-2D illustrate the foldable mobile device 100 in different orientations. FIG. 2A illustrates the foldable mobile device 100 in a closed or folded state. FIG. 2B illustrates the foldable mobile device 100 in a partially open fold state. FIG. 2C illustrates the foldable mobile device 100 in a wide open fold state. FIG. 2D illustrates the foldable mobile device 100 in a fully open fold state.

With reference to FIGS. 1A-2D, the foldable mobile device 100 is illustrated in a closed or folded state in FIG. 2A, which may correspond to when the first and second panels 111, 121 are folded over onto one another. Referring to FIG. 2B, the closed or folded state may also correspond to when the fold angle $\alpha$, between first and second faces 113, 123, is a relatively small angle (e.g., $10° > \alpha$). In the closed or folded state, although the image sensor 130 may be directly opposite or even in contact with the predetermined feature 140, the image sensor 130 may have difficulty in visualizing the predetermined feature 140. For example, with the predetermined feature 140 and the image sensor 130 in such close proximity, the image sensor 130 may not be able to focus on the predetermined feature 140. Additionally or alternatively, the display 125, which may be used to generate the predetermined feature 140, may be turned off when the foldable mobile device 100 is in the closed state and thus not displaying anything.

Although illustrated as being disposed directly opposite one another in the closed or folded state, the image sensor 130 and the predetermined feature 140 may not need to be directly opposite one another. The predetermined feature 140 should be within the visual field of the image sensor 130 at least over a select range of fold angles $\alpha$ in accordance with various embodiments. In some embodiments, the predetermined feature 140 may be disposed in a first location over a first range of fold angles (e.g., $0° \le \alpha < 60°$) and disposed in a second location over a second range of fold angles a (e.g., $60° \le \alpha < 120°$). Alternatively, a first predetermined feature (e.g., 140) may be used over a first range of fold angles (e.g., $0° \le \alpha < 60°$) and a second predetermined feature (e.g., 141) may be used over a second range of fold angles $\alpha$ (e.g., $60° \le \alpha < 120°$).

With reference to FIG. 2B, the foldable mobile device 100 is illustrated in a partially open fold state, which may correspond to when the fold angle $\alpha$, between first and second faces 113, 123, is an acute angle or at least 90° or less. Alternatively, the partially open state may correspond with a different range of angles. In the partially open fold state, the predetermined feature 140 may be within the visual field of the image sensor 130. The type and capabilities of the image sensor 130 may dictate the range of fold angles $\alpha$ that fall within the visual field of the image sensor 130.

With reference to FIGS. 1A-3B, an image of a predetermined feature 140 will differ depending on whether the foldable mobile device is open, closed or partially closed. FIG. 3A illustrates an example of a predetermined feature 140 that may be generated by a display (e.g., 125), while FIG. 3B illustrates an image 145 of the same predetermined feature (e.g., 140) from the perspective of the image sensor 130 when the foldable mobile device 100 is in the folded or closed state. In this example, in the closed or folded state the image sensor 130 may not be able to see the predetermined feature, regardless of whether it is generated by the display or whether it is a permanent feature on the second face (e.g., 123). Nonetheless, the image sensor 130 may be used by a processor of the foldable mobile device 100 to detect the blockage created by the display 125 resting up against the image sensor 130. This blockage may be associated with a closed or folded state, which may be registered and/or reported by the processor.

FIG. 4A illustrates an example of the predetermined feature 140 that may be generated by a display (e.g., 125) when the foldable mobile device 100 is in one particular configuration (i.e., a particular fold angle $\alpha$) of the partially open fold state. FIG. 4B illustrates a perceived feature 140' that is what the predetermined feature may look like from the perspective of the image sensor 130 when the foldable mobile device 100 is in the one particular configuration of the partially open fold state. As shown in FIG. 4B, in the partially open fold state the perceived feature 140' may appear shorter along the y-axis than the predetermined feature (e.g., 140) actually is due the fold angle (e.g., $\alpha$) between the first and second panels (e.g., 111, 121). Since a dimension of the predetermined feature along the y-axis may be a known value, the processor may use a measured value of the perceived feature 140' to determine the fold angle $\alpha$ that corresponds to the measured value. In addition, the determined fold angle $\alpha$ will also fall within a range of values that may determine the fold state of the foldable mobile device 100, such as the partially open fold state.

Referring back to FIG. 2C, the foldable mobile device 100 is illustrated in a wide open fold state, which corresponds to when the fold angle $\alpha$, between first and second faces 113, 123, is an obtuse angle ((e.g., $90° < \alpha < 180°$). In the wide open fold state, the second predetermined feature 141 may be within the visual field of the image sensor 130 and thus used to determine a fold angle $\alpha$ of the foldable mobile device 100. The second predetermined feature 141 may be used by the processor when the device is in the wide open fold state, rather than the first predetermined feature 140, because the second predetermined feature 141 may be an element or use elements already naturally displayed on the display 125 in that fold state. For example, the second predetermined feature 141 may be a status bar, which is normally displayed when the display 125 is active. Alternatively, the processor of the foldable mobile device 100 may continue to use the first predetermined feature 140 for measurements to determine and report a fold state of the foldable mobile device 100.

Figure 5A:
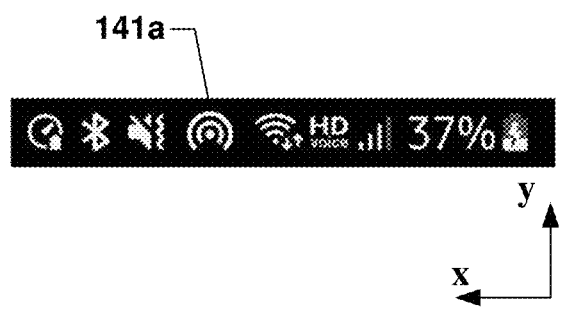
FIG. 5A is a plan view of another predetermined feature according to some embodiments.
Figure 5B:
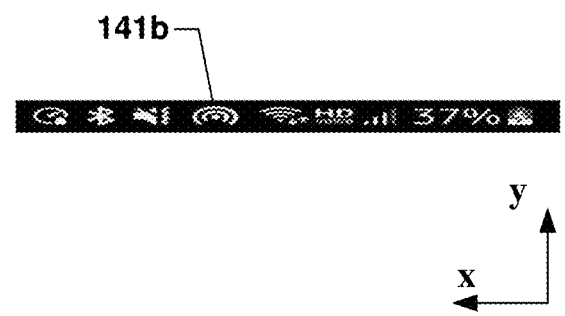
FIG. 5B is a plan view of a visualization of the other predetermined feature in FIG. 5A from the perspective of an image sensor with the foldable mobile device in a wide open fold state in a wide open fold state when the display is in the landscape format or in a mobile device that folds along the long axis of the display according to some embodiments.
Figure 5C:
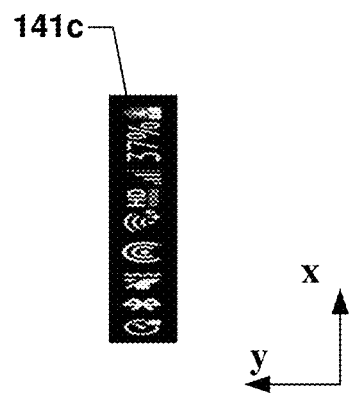
FIG. 5C is a plan view of a visualization of the other predetermined feature in FIG. 5A from the perspective of an image sensor with the foldable mobile device when the display is in the portrait format or in a wide open fold state in a mobile device with a folding axis across a width of the display according to some embodiments.

FIG. 5A illustrates an example of the second predetermined feature 141*a* that may be generated by a display (e.g., 125) when the foldable mobile device 100 is in a particular configuration (i.e., a particular fold angle α) of the wide open fold state. FIG. 5B illustrates a perceived second feature 141*b* that is what the second predetermined feature looks like from the perspective of the image sensor 130 when the foldable mobile device 100 is in the wide open fold state when the display is in the landscape format for a mobile device with a folding axis along the long axis of the display in some embodiments. FIG. 5C illustrates a perceived second feature 141*c* that is what the second predetermined feature looks like from the perspective of the image sensor 130 when the foldable mobile device 100 is in the wide open fold state when the display is in the portrait format or when the display is in landscape format on a mobile device with a folding axis across a width of the display in some embodiments.

As shown in FIG. 5A, the perceived feature 141*a* as imaged by an imaging sensor may appear with the same dimensions relative to an X-Y axis as presented on the display.

As shown in FIG. 5B, when the display is in the landscape format or in a mobile device that folds along the long axis of the display in the wide open fold state the second perceived feature 141*b* may appear compressed along the y-axis compared to the predetermined feature (e.g., 141) presented on the display due the fold angle (e.g., α) between the first and second panels (e.g., 111, 121).

As shown in FIG. 5C, due the fold angle (e.g., α) between the first and second panels (e.g., 111, 121) the second perceived feature 141*c* may appear compressed along one axis (X or Y depending on the device configuration) compared to the predetermined feature 141*a* presented on the display when the display is in the portrait format on a mobile device that folds along the long axis of the display or in the landscape format in a mobile device that folds across the width of the display in the wide open fold state.

As illustrated in FIGS. 5A-5C, since a dimension of the second predetermined feature along one axis may be a known value, the processor may use a measured value of the second perceived feature 141*b*, 141*c* to determine the fold angle α that corresponds with the measured value. In addition, the determined fold angle α will also fall within a range of values that may determine the fold state of the foldable mobile device 100, such as the wide open fold state.

Referring back to FIG. 2D, the foldable mobile device 100 is illustrated in a fully open fold state, which corresponds to when the fold angle α, between first and second faces 113, 123 is approximately 180°. In the fully open fold state, no predetermined feature may be visible within the visual field of the image sensor 130. In fact, no other part of the foldable mobile device 100 may be visible within the visual field of view of the image sensor 130 when the foldable mobile device 100 is in the fully open fold state. The processor of the foldable mobile device 100 may determine that the foldable mobile device 100 is in the wide open fold state when a predetermined feature is not present within the field of view of the image sensor and/or determining that the second face (e.g., 123) is not blocking the image sensor 130 (e.g., using light levels, a proximity sensor, etc.).

Figure 6:
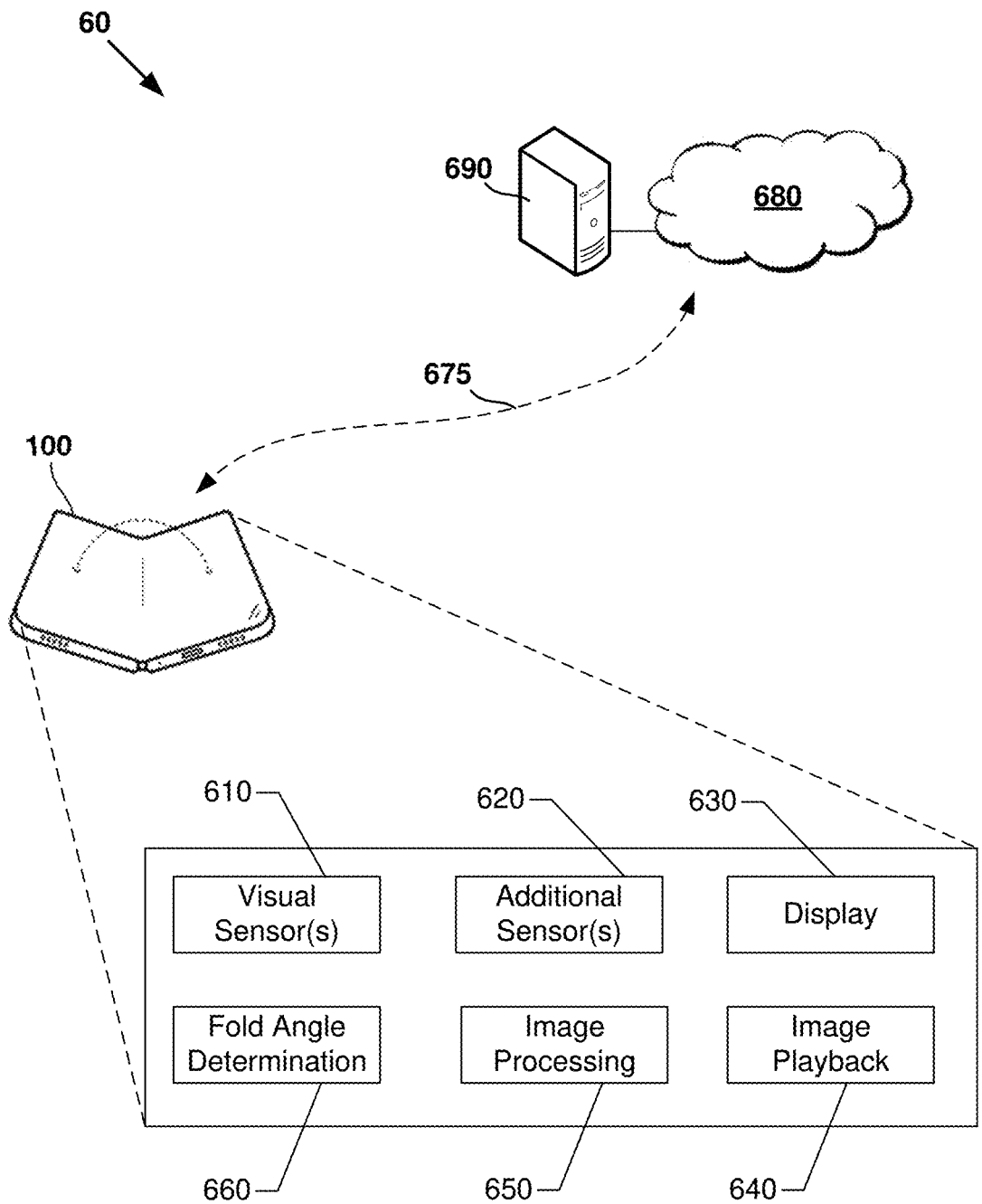
FIG. 6 is a component block diagram illustrating a foldable mobile device suitable for implementing various embodiments.

FIG. 6 illustrates the foldable mobile device 100 configured to detect and report a fold state thereof in a communication network 60 suitable for implementing various embodiments. For example, at regular intervals or based on other triggering events, the foldable mobile device 100 may activate an onboard image sensor for imaging and measuring a predetermined shape in order to determine a fold state of the device. The foldable mobile device 100 may be configured by machine-readable instructions, which may include one or more instruction modules. The instruction modules may include computer program modules. In particular, the instruction modules may include one or more of an image sensor(s) module 610, an additional sensor(s) module 620, a display module 630, an image playback module 640, an image processing module 650, a fold angle determination module 660, and/or other instruction modules.

The image sensor(s) module 610 may be configured to communicate with and/or control one or more image sensors (e.g., 130) of the foldable mobile device 100. Control of the one or more image sensors may include managing an activation schedule or trigger events associated with powering the image sensor(s) (e.g., on, off, dormant/sleep, etc.) or controlling settings thereof. The foldable mobile device 100 may use image sensors to image surroundings and collect contextual information from the environment around the foldable mobile device 100.

The additional sensor(s) module 620 may be configured to communicate with and/or control one or more other sensors of the foldable mobile device 100. Control of the one or more other sensors may include managing an activation schedule or trigger events associated with the sensor(s) (e.g., on, off, dormant/sleep, etc.) or controlling settings thereof. In some embodiments, the foldable mobile device 100 may have a suite of different types of sensors, such as one or more of an accelerometer (e.g., for tracking movement), a Photoplethysmography (PPG) sensor, a microphone, a thermometer, a light sensor, a near field communication (NFC) receiver for detecting/communicating with NFC-equipped devices (e.g., radio frequency tags), a pedometer, a Global Positioning System (GPS) receiver, motion sensor, and the like.

The display module 630 may be configured to control one or more displays (e.g., 115, 125) of the foldable mobile device 100. For example, the display module 630 may control how and where the predetermined feature(s) (e.g., 140, 141) are displayed.

The image playback module 640 may be used to playback and compare collected images to saved reference images. Such comparison may be used to verify whether predetermined features are detected and/or measurements of the detected predetermined features.

The image processing module 650 may be used to collect, playback, and/or analyze images collected by the image sensor(s). For example, the image processing module 650 may analyze one or more collected images to determine whether a predetermined feature is detected and if so, measure characteristics of the detected predetermined feature.

The fold angle determination module 660 may be configured to calculate a current fold angle of the foldable mobile device 100 based on the measurements calculated by the image processing module 650.

The foldable mobile device 100 may be communicatively coupled to peripheral device(s) (not shown) and configured to communicate with remote computing devices 690 and/or other external resources (not shown) using the wireless transceiver to establish a wireless communication link 675 with a communication network 680, such as a cellular communication network. The foldable mobile device 100 may access the communication network 680 via one or more base stations, which in-turn may be communicatively coupled to the remote computing device(s) 690 through wired and/or wireless connections. Similarly, the remote computing device(s) 690 may be configured to communicate with the foldable mobile device 100 and/or the external resources using the wireless transceiver and the communication network 680.

As described in more detail with reference to FIGS. 7 and 8, the foldable mobile device 100 may include a plurality of hardware, software, and/or firmware components operating together to provide the functionality attributed herein to the foldable mobile device 100. For example, the foldable mobile device 100 may include one or more processors configured to execute computer program modules similar to those in the machine-readable instructions of the remote computing device(s) 690 described above.

Figure 7:
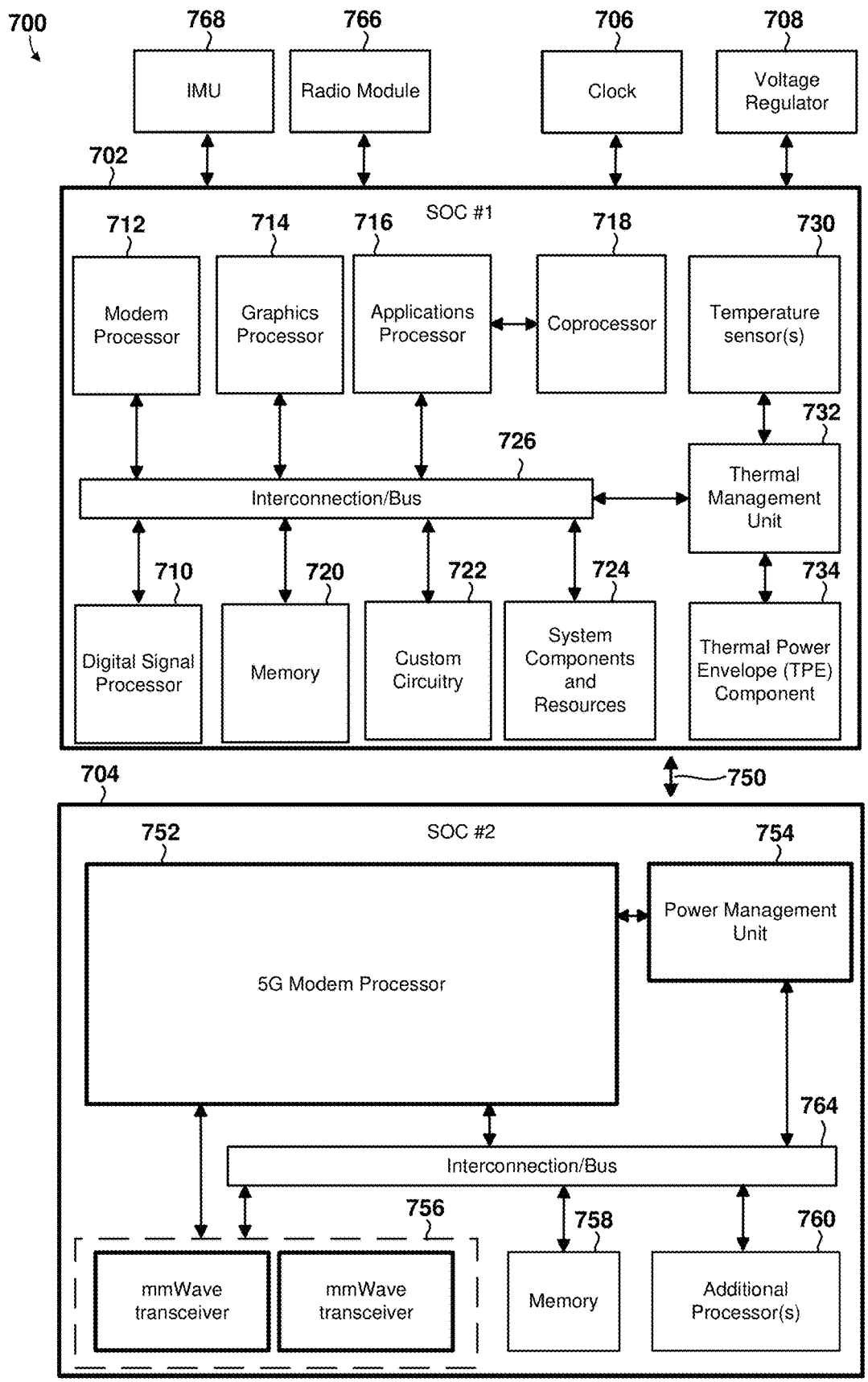
FIG. 7 is a component block diagram illustrating an example processing system including a wireless modem suitable for implementing various embodiments.

FIG. 7 is a component block diagram illustrating an example processing system 700 including a wireless modem suitable for implementing various embodiments. With reference to FIGS. 1A-7, the illustrated example processing system 700 includes two SOCs 702, 704, a clock 706, a voltage regulator 708, a wireless transceiver 766, and an output device 768 such as a display device, a sound output device (e.g., a speaker), a haptic feedback device, etc. In some embodiments, the first SOC 702 operates as central processing unit (CPU) of the wireless device that carries out the instructions of software application programs by performing the arithmetic, logical, control and input/output (I/O) operations specified by the instructions. In some embodiments, the second SOC 704 may operate as a specialized processing unit. For example, the second SOC 704 may operate as a specialized 5G processing unit responsible for managing high volume, high speed (e.g., 5 Gbps, etc.), and/or very high frequency short wave length (e.g., 28 GHz millimeter wave (mmWave) spectrum, etc.) communications.

The first SOC 702 may include a digital signal processor (DSP) 710, a modem processor 712, a graphics processor 714, an application processor 716, one or more coprocessors 718 (e.g., vector co-processor) connected to one or more of the processors, memory 720, custom circuitry 722, system components and resources 724, an interconnection/bus module 726, one or more sensors 730 (e.g., thermal sensors, motion sensors, proximity sensors, a multimeter, etc.), a thermal management unit 732, and a thermal power envelope (TPE) component 734. The second SOC 704 may include a 5G modem processor 752, a power management unit 754, an interconnection/bus module 764, memory 758, and various additional processors 760, such as an applications processor, packet processor, etc. The second SOC 704 may further be coupled to a plurality of mmWave transceivers 756, which may be separate integrated circuits that are radio frequency shielded on or packaged separate from the second SOC 704 as indicated by the dashed line.

Each processor 710, 712, 714, 716, 718, 752, 760 may include one or more cores, and each processor/core may perform operations independent of the other processors/cores. For example, the first SOC 702 may include a processor that executes a first type of operating system (e.g., FreeBSD, LINUX, OS X, etc.) and a processor that executes a second type of operating system (e.g., iOS, Microsoft Windows 11 or earlier, etc.). In addition, any or all of the processors 710, 712, 714, 716, 718, 752, 760 may be included as part of a processor cluster architecture (e.g., a synchronous processor cluster architecture, an asynchronous or heterogeneous processor cluster architecture, etc.).

The first and second SOC 702, 704 may include various system components, resources, and custom circuitry for managing sensor data, analog-to-digital conversions, wireless data transmissions, and for performing other specialized operations, such as decoding data packets and processing encoded audio and video signals for rendering in a web browser. For example, the system components and resources 724 of the first SOC 702 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 724 and/or custom circuitry 722 may also include circuitry to interface with peripheral devices, such as cameras, electronic displays, wireless communication devices, external memory chips, etc.

The first and second SOC 702, 704 may communicate via interconnection/bus module 750. The various processors 710, 712, 714, 716, 718, may be interconnected to one or more memory elements 720, system components and resources 724, and custom circuitry 722, and a thermal management unit 732 via an interconnection/bus module 726. Similarly, the processor 752 may be interconnected to the power management unit 754, the mmWave transceivers 756, memory 758, and various additional processors 760 via the interconnection/bus module 764. The interconnection/bus module 726, 750, 764 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 702, 704 may further include an input/output module (not illustrated) for communicating with resources external to the SOC, such as a clock 706 and a voltage regulator 708. Resources external to the SOC (e.g., clock 706, voltage regulator 708) may be shared by two or more of the internal SOC processors/cores.

In addition to the example processing system 700 discussed above, various embodiments may be implemented in a wide variety of computing systems, which may include a single processor, multiple processors, multicore processors, or any combination thereof. In some embodiments, only one SOC (e.g., 702, 704) may be used in a less capable computing device that are configured to provide sensor information to a more capable computing device.

Figure 8A:
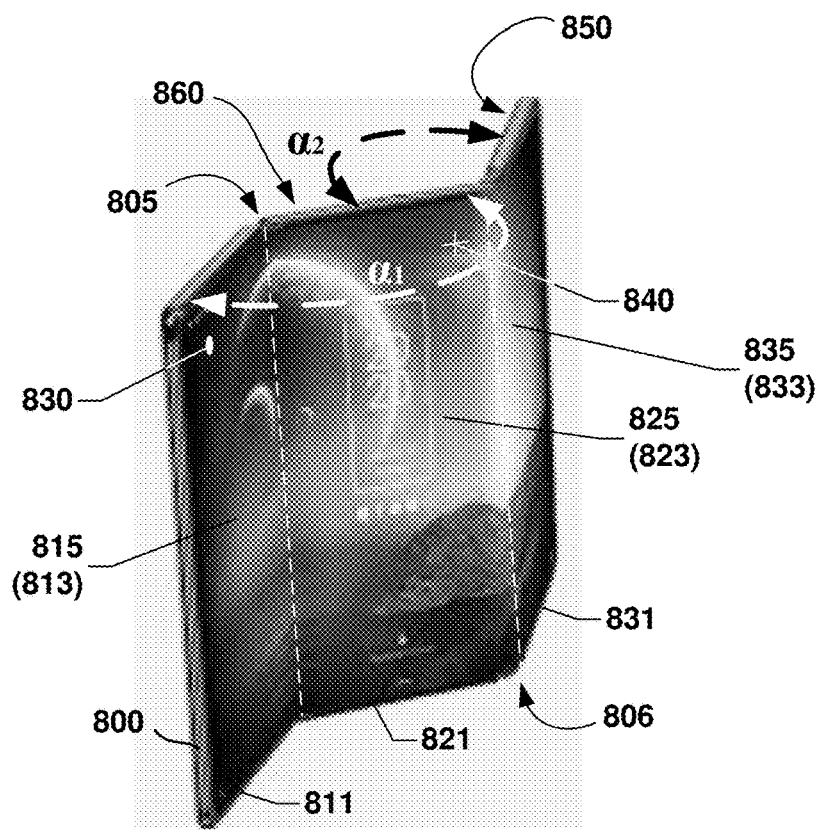
FIG. 8A is a perspective view of a tri-fold foldable mobile device in a bilateral partially open fold state according to some embodiments.
Figure 8B:
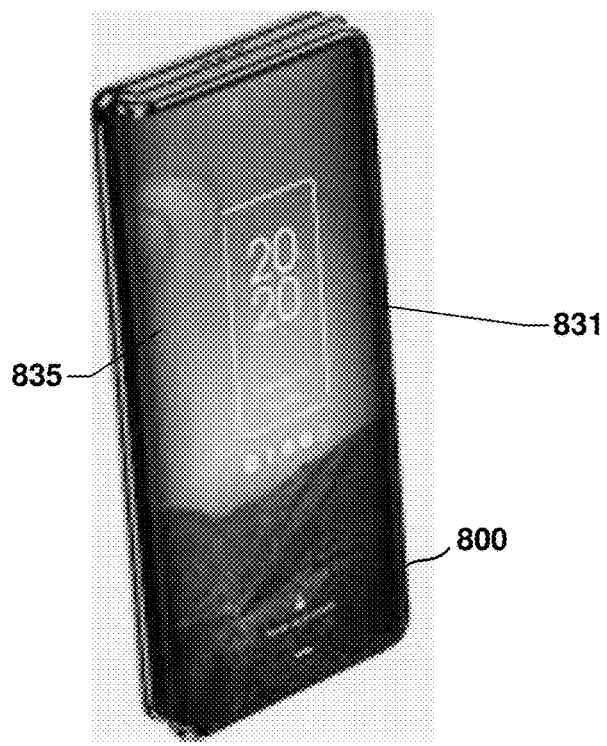
FIG. 8B is a perspective view of the foldable mobile device of FIG. 8A in a bilateral closed or folded state according to some embodiments.

FIGS. 8A and 8B illustrate a foldable mobile device 800 configured to detect a fold state thereof, according to some embodiments. FIG. 8A illustrates the foldable mobile device 800 in a bilateral partially open fold state (i.e., both sides are partially open). FIG. 8B illustrates the foldable mobile device 800 in a bilateral closed or folded state (i.e., both sides are closed).

With reference to FIGS. 1A-8B, the foldable mobile device 800 may include all the elements, features, and functionality described above with regard to the foldable mobile device 100. In addition, the foldable mobile device 800 may include two spaced apart hinges 805, 806 that extend parallel to one another. A first hinge 805 pivotally couples a first panel 811 and a second panel 821 to fold into one or more fold states. The first panel 811 includes a first face 813 on one side that is completely covered by a first display 815. Similarly, the second panel 821 may include a second face 823 on one side that is completely covered by a second display 825. A second hinge 806 pivotally couples the second panel 821 and a third panel 831 to fold into one or more fold states. The third panel 831 includes a third face 833 on one side that is completely covered by a third display 835.

Referring to FIG. 8A, the numbering for the first, second, and third faces 813, 823, 833 is shown within parenthesis because those surfaces are fully covered by the first, second, and third displays 815, 825, 835, respectively. The hinges 805, 806 may be any type of movable joint or mechanism on which one or any of the panels 811, 821, 831 swing as either side of the foldable mobile device 800 opens and closes. Each side may open and/or close independently of the other. In this way, the first, second, and third panels 811, 821, 831 may be separate components joined by the hinges 805, 806. Alternatively, the first, second, and third panels 811, 821, 831 may be one continuous panel configured to bend and/or fold in a region, such as along the line corresponding to each of the hinges 805, 806. Pivoting the first and second panels 811, 821 changes the fold state of a first lateral side of the foldable mobile device 800 (i.e., the left side of the foldable mobile device 800 in the orientation shown in FIG. 8A).

As shown in FIG. 8B, the fold states of the first lateral side include a closed state in which the first and second panels 811, 821 abut one another along the respective first and second faces 813, 823. Thus, in the closed state, the first and second faces 813, 823 of the first and second panels 811, 821 directly face toward one another. As the first and second panels 811, 821 are pivoted relative to one another from the closed state, at least the first lateral side of the foldable mobile device 800 starts opening into one or more open states. In the open states, the first and second faces 813, 823 either face at least partially away from one another (i.e., closer to the closed state) or completely away from one another (i.e., further from the closed state). As the first and second panels 811, 821 unfold from the closed state, a first fold angle $\alpha_1$ is defined between the first and second faces 813, 823. The greater the fold angle $\alpha_1$, the greater the open state of the first lateral side.

Similarly, pivoting the second and third panels 821, 831 changes the fold state of a second lateral side of the foldable mobile device 800 (i.e., the ride side of the foldable mobile device 800 in the orientation shown in FIG. 8A). The fold states of the second lateral side include a closed state in which the second and third panels 821, 831 abut one another along the respective second and third faces 823, 833, as shown in FIG. 8B. Thus, in the closed state, the second and third faces 823, 833 of the second and third panels 821, 831 directly face toward one another. As the second and third panels 821, 831 are pivoted relative to one another from the closed state, at least the second lateral side of the foldable mobile device 800 starts opening into one or more open states. In the open states, the second and third faces 823, 833 either face at least partially away from one another (i.e., closer to the closed state) or completely away from one another (i.e., further from the closed state). As the second and third panels 821, 831 unfold from the closed state, a second fold angle $\alpha_2$ is defined between the second and third faces 823, 833. The greater the second fold angle $\alpha_2$, the greater the open state of the second lateral side.

In some embodiments, at least one of the first, second, and third panels 811, 821, 831 may include an image sensor 830 (e.g., a camera), which may be located on one of the first, second, and third faces 813, 823, 833 (e.g., on the first face 813). In addition, on at least one of the other of the first, second, and third faces (e.g., the second face 823), the foldable mobile device 800 may have or be configured to display one or more predetermined features 840. In FIG. 8A the first predetermined feature 840 is illustrated as a plus (+) symbol. Alternatively, the first predetermined feature 840 may be a symbol (e.g., circle, square, cross, special character), encoded mark (e.g., QR code, bar code), watermark, status bar, image, part of an image, or other predetermined element the size of which may be measured remotely.

A processor of the foldable mobile device 800 may use the image sensor 830 to measure the predetermined feature 840 in order to determine a fold state of the first lateral side of the foldable mobile device in accordance with the various embodiment. The predetermined feature 840 may be similar to that described above with regard to the predetermined features (e.g., 140, 141) of the bi-fold foldable mobile device (e.g., 100). In addition, the display of the predetermined feature 840, including how the predetermined feature 840 appears and what it looks like, may be changed in accordance with various embodiments (e.g., once the fold angle is smaller or larger than a predetermined angle). With the fold state of the first lateral side of the foldable mobile device determined, the processor may trigger and/or activate/deactivate other processes or applications.

Similar to the first lateral side, the second lateral side may include a second image sensor 850 and another predetermined feature 860. However, since the first and third panels 811, 831 of the foldable mobile device 800 fold toward the closed or folded state in opposite directions the second image sensor 850 and the other predetermined feature 860 may be located on a back side of the foldable mobile device 800.

A processor of the foldable mobile device 800 may use the second image sensor 850 to measure the other predetermined feature 860 in order to determine a fold state of the second lateral side of the foldable mobile device in accordance with the various embodiment. The other predetermined feature 860 may be similar to that described above with regard to the predetermined features (e.g., 140, 141, 840). In addition, the display of the other predetermined feature 860, including how the other predetermined feature 860 appears and what it, may be changed in accordance with various embodiments (e.g., once the fold angle is smaller or larger than a predetermined angle). With the fold state of the second lateral side of the foldable mobile device determined, the processor may trigger and/or activate/deactivate other processes or applications.

Alternatively, the image sensor (e.g., 830, 850) may both be integrated into the second panel 821, such as with the first image sensor 830 facing out from one side of the second panel and the second image sensor 850 facing out from the opposite side of the second panel. In addition, the predetermined features (e.g., 840, 860) may be located or made to display on the first and third panels 811, 831.

Figure 9A:
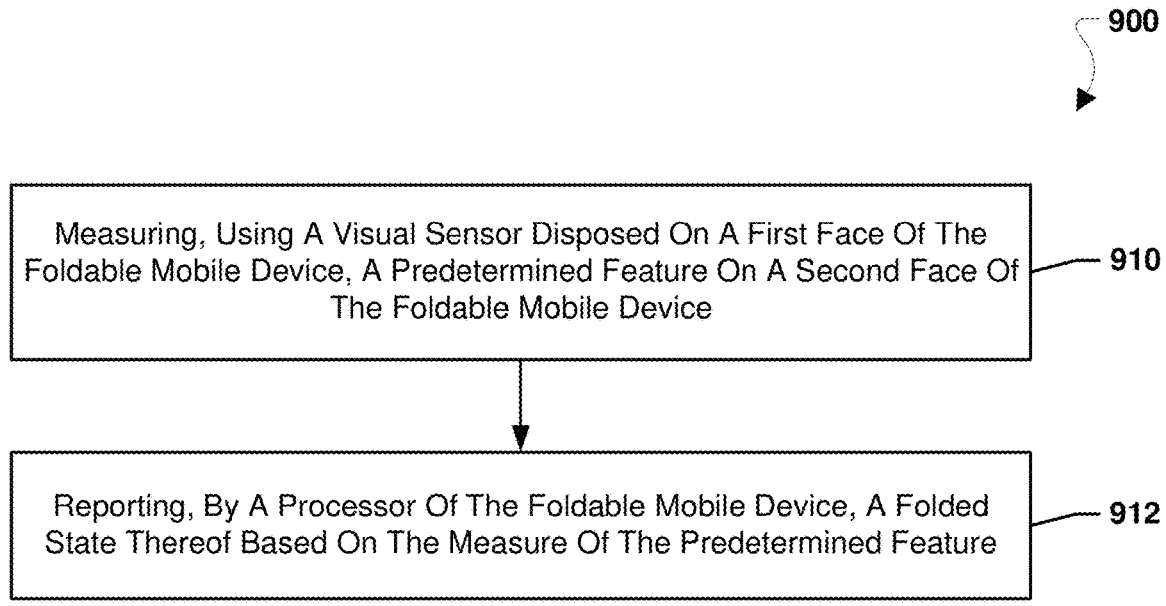
FIG. 9A is a process flow diagram illustrating operations of an example method of detecting a fold state of a foldable mobile device according to various embodiments.

FIG. 9A is a process flow diagram illustrating an example method 900 that may be performed by a processor of a foldable mobile device according to various embodiments. With reference to FIGS. 1A-9A, means for performing each of the operations of the method 900 may be a processor (e.g., 710, 712, 714, 716, 718, 752, and 760) and an image sensor (e.g., 130, 830, 850) of a foldable mobile device (e.g., 100, 800) and the like.

In block 910, an image sensor (e.g., 130, 830, 850) disposed on a first face of the foldable mobile device may capture an image a predetermined feature on a second face of the foldable mobile device, and a processor of the foldable mobile device may measure a dimension, shape, orientation or other factor of the predetermined feature in the capture image. As described above, the foldable mobile device may include a hinge coupling the first and second faces pivotally to fold into one or more fold states. The fold states may include a closed state in which the first and second faces face one another and an open state in which the first and second faces at least partially face away from one another. For example, the image sensor may measure a perceived dimension of the predetermined feature for comparison to a known length of that dimension for determining a fold angle of the foldable mobile device.

In some embodiments, the predetermined feature may be generated by the processor and rendered on a display (e.g., 115, 125, 815, 825, 835) of the foldable mobile device, such as on the second face. In some embodiments, the predetermined feature may be an element on a status bar of a display on the second face of the foldable mobile device. Alternatively, the predetermined feature may be a fixed element visible on at least one of the first and second faces of the foldable mobile device. In various embodiments, a measure of the predetermined feature may correspond to an angle between the first and second faces.

In block 912, a processor of the foldable mobile device may report a fold state of the foldable mobile device based on the measure of the predetermined feature. In some embodiments, reporting the fold state may include reporting a measured fold angle. In some embodiments, the reported fold state may be based on a dimension determined from the measure of the predetermined feature. The dimension determined from the measure of the predetermine feature may be measured along a single axis of the predetermined feature (e.g., y-axis). In response to the fold angle being greater than zero and less than a low angular threshold, the fold state being reported as "ajar." For example, the low angular threshold may be 30 degrees. The ajar fold state may represent a partially open fold state in which the display(s) of the foldable mobile device 100 cannot generally be used, which may trigger events like placing the foldable mobile device 100 in a sleep mode. In response to the fold angle exceeding the low angular threshold, the processor may report the fold state as open. The low angular threshold may be greater than zero so that the fold angle needs to be greater than a nominal value before the foldable mobile device is considered open. The processor may repeat the method 900 periodically, continuously, or in response to an event (e.g., touch or movement as detected by an internal accelerometer).

In some embodiments, reporting the fold state may include automatically activating an operational feature of the foldable mobile device. For example, certain fold states may correspond to certain operating modes, such as a closed or folded state corresponding to a dormant mode and a fully open fold state corresponding to a tablet mode. Alternatively, other fold states may correspond to one or more other operating modes. In some embodiments, reporting the fold state may include launching a particular application configured to launch when that particular fold state is detected.

Figure 9B:
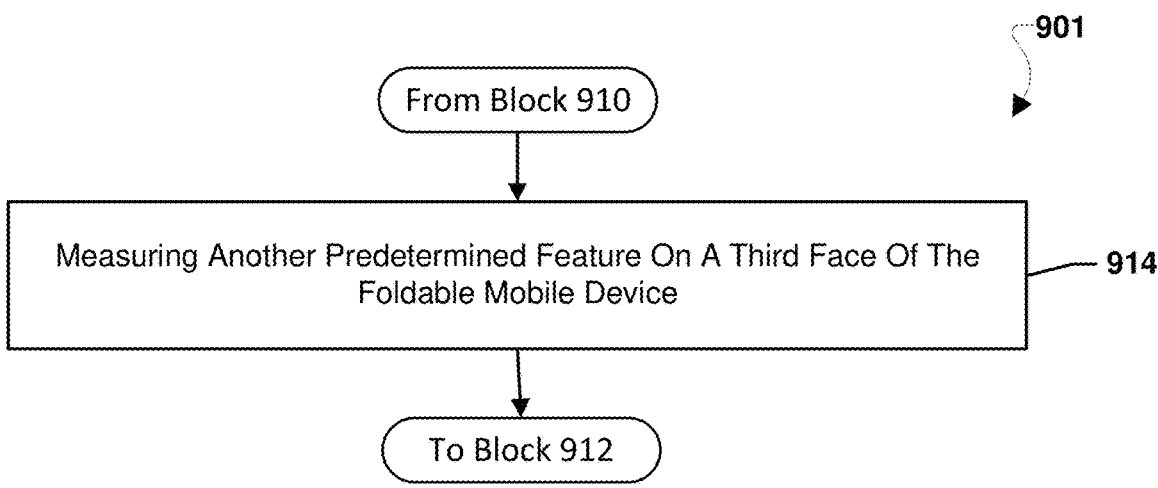
FIGS. 9B is a process flow diagram illustrating additional operations that may be performed as part of the method of detecting a fold state of a foldable mobile device according to various embodiments.

FIG. 9B is a process flow diagram illustrating operations 901 that may be performed by a processor of a foldable mobile device as part of the method 900 according to some embodiments. With reference to FIGS. 1A-9B, means for performing the operations 901 may be a processor (e.g., 710, 712, 714, 716, 718, 752, and 760) and an image sensor (e.g., 830, 850) of a tri-fold foldable mobile device (e.g., 800) and the like.

Following the operations in block 910 of the method 900, the processor may measure another predetermined feature (e.g., 860) on a third face of the foldable mobile device in block 914. Alternatively, the operation in block 914 may follow the operations in block 912 of the method 900. In this alternative, following the operations in block 914, the processor of the foldable mobile device may also report the fold state of the second lateral side of the tri-fold foldable mobile device.

In block 914, the processor may measure another predetermined feature on a third face of the foldable mobile device. The third face may be located on a third panel of a tri-fold foldable mobile device. In some embodiments, reporting the fold state of the foldable mobile device may be based on at least one of the measure of the predetermined feature or the measure of the other predetermined feature. Following the operations in block 914, the processor may report the folded state of the foldable mobile device in block 912 of the method 900 as described. The operations 901 may repeat periodically, continuously, or at some other interval.

Figure 10:
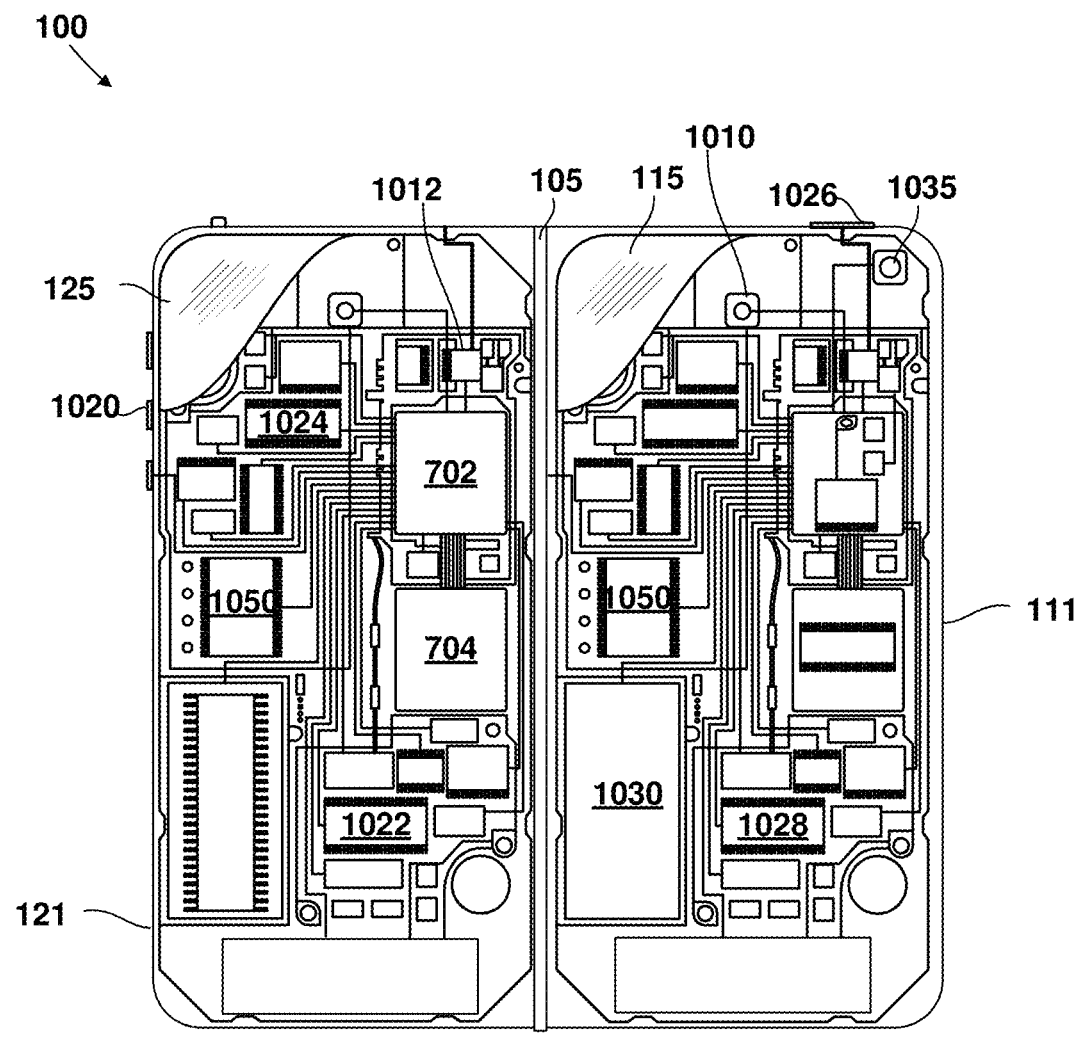
FIG. 10 is a component block diagram of a foldable mobile device suitable for use with various embodiments.

FIG. 10 is a component block diagram of a foldable mobile device suitable for use with various embodiments. With reference to FIGS. 1A-10, various embodiments (including embodiments discussed above with reference to FIGS. 1A-9B) may be implemented on a variety of foldable mobile device, an example of which is illustrated in FIG. 10 in the form of foldable mobile device 100. The first and second panels 111, 121 may be coupled by a hinge 105. In addition, the first and second panels 111, 121 may include one or more display devices 115, 125 that is/are configured to display information. The display devices 115, 125 also may be configured to receive a user input (e.g., a touch-screen display or the like).

The foldable mobile device 100 may include a number of sensors that may be configured to obtain information about wearer actions and external conditions that may be useful for sensing images, sounds, motions and other phenomena. In some embodiments, foldable mobile device 100 may include an image sensor 1035 (e.g., a camera) configured to capture still images or video. In some embodiments, the foldable mobile device 100 may include a microphone 1010 positioned and configured to record sounds in the vicinity of the foldable mobile device 100. In some embodiments, foldable mobile device 100 may include other sensors (e.g., a thermometer, heart rate monitor, body temperature sensor, pulse oximeter, etc.) for collecting information pertaining to environment and/or user conditions.

The foldable mobile device 100 may include a processing system 1012 that includes processing and communication SOCs 702, 704 which may include one or more processors (e.g., 710, 712, 714, 716, 718, 752, and 760) one or more of which may be configured with processor-executable instructions to perform operations of various embodiments. The processing and communications SOCs 702, 704 may be coupled to sensors 1020, internal memory 1022, and communication circuitry 1024 coupled one or more antenna 1026 for establishing a wireless communication link (e.g., with the remote computing device(s) 690 and/or the communication network 680). The processing and communication SOCs 702, 704 may also be coupled to sensor interface circuitry 1028 configured to control and received data from the image sensor 1035, microphone(s) 1010, and other sensors positioned on the body 121, 111.

The sensors 1020 may include an inertial measurement unit (IMU) that includes electronic gyroscopes, accelerometers, and a magnetic compass configured to measure movements and orientation of the foldable mobile device 100. The sensors 1020 may further include a magnetometer, an altimeter, an odometer, and an atmospheric pressure sensor, as well as other sensors useful for determining the orientation and motions of the foldable mobile device 100. The processing system 1012 may further include a power source such as a rechargeable battery 1030 coupled to the SOCs 702, 704 as well as to external sensors on the body 121, 111.

The processors of the foldable mobile device 100 may be any programmable microprocessor, microcomputer or multiple processor chip or chips that can be configured by software instructions (applications) to perform a variety of functions, including the functions of some implementations described below. In some wireless devices, multiple processors may be provided, such as one processor within an SOC 704 dedicated to wireless communication functions and one processor within an SOC 702 dedicated to running other applications. Software applications may be stored in the memory 1050 before they are accessed and loaded into the processor. The processors may include internal memory sufficient to store the application software instructions.

The processors implementing various embodiments may be any programmable microprocessor, microcomputer or multiple processor chip or chips that can be configured by software instructions (applications) to perform a variety of functions, including the functions of the various embodiments described in this application. In some communication devices, multiple processors may be provided, such as one processor dedicated to wireless communication functions and one processor dedicated to running other applications. Typically, software applications may be stored in the internal memory before they are accessed and loaded into the processor. The processor may include internal memory sufficient to store the application software instructions.

Some implementation examples are described in the following paragraphs.

Example 1. A foldable mobile device, including: a first face; a second face; a hinge coupling the first and second faces and configured to fold the foldable mobile device into one or more fold states, an image sensor disposed on the first face; and a processor coupled to the first display, the second display and the image sensor, in which the processor is configured to: measure by the image sensor a predetermined feature on the second face; and report a fold state of the foldable mobile device based on the measure of the predetermined feature.

Example 2. The foldable mobile device of example 1, in which the processor is further configured to base the reported fold state on a dimension determined from the measure of the predetermined feature.

Example 3. The foldable mobile device of either of examples 1 or 2, in which the processor is further configured to generate the predetermined feature on a display on the second face.

Example 4. The foldable mobile device of any of examples 1-3, in which the predetermined feature is an element on a status bar of a display on the second face.

Example 5. The foldable mobile device of any of examples 1-4, in which the processor is further configured to identify a fold angle between the first and second faces based on the measure of the predetermined feature.

Example 6. The foldable mobile device of example 5, in which the processor is further configured to report the fold state as ajar in response to the fold angle being greater than zero and less than a low angular threshold.

Example 7. The foldable mobile device of example 5, in which the processor is further configured to report the fold state as open in response to the fold angle being greater than a low angular threshold greater than zero.

Example 8. The foldable mobile device of any of examples 1-7, in which the predetermined feature is not visible to the naked eye.

Example 9. The foldable mobile device of any of examples 1-8, in which the processor is further configured to measure the predetermined feature by measuring a first predetermined feature for a first range of fold angles between the first and second faces and measuring a second predetermined feature for a second range of fold angles between the first and second faces.

Example 10. The foldable mobile device of any of examples 1-9, in which the processor is further configured to: measure another predetermined feature on a third face of the foldable mobile device; and report the fold state of the foldable mobile device based on at least one of a measure of the predetermined feature or a measure of the other predetermined feature.

Example 11. The foldable mobile device of any of examples 1-10, in which either or both of the first face and the second face includes a display.

Further implementation examples are described in the following paragraphs. While the following implementation examples are described in terms of example methods, further example implementations may include the example methods discussed in the following paragraphs implemented by a computing device comprising means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 12. A method of detecting a fold state of a foldable mobile device, including: measuring, using an image sensor disposed on a first face of the foldable mobile device, a predetermined feature on a second face of the foldable mobile device, in which the foldable mobile device includes a hinge coupling the first and second faces pivotally to fold into one or more fold states, in which the fold states include a closed state in which the first and second faces face one another and an open state in which the first and second faces at least partially face away from one another; and reporting, by a processor of the foldable mobile device, a fold state of the foldable mobile device based on the measure of the predetermined feature.

Example 13. The method of example 12, in which the reported fold state is based on a dimension determined from the measure of the predetermined feature.

Example 14. The method of either of example 12 or 13, in which the predetermined feature is generated by a display of the foldable mobile device.

Example 15. The method of any of examples 12-14, in which the predetermined feature is an element on a status bar of a display of the foldable mobile device.

Example 16. The method of any of examples 12-15, in which a measure of the predetermined feature determined from the measuring thereof corresponds to a fold angle between the first and second faces.

Example 17. The method of example 16, in which reporting the fold state of the foldable mobile device based on the measure of the predetermined feature includes reporting the fold state as ajar in response to the fold angle being greater than zero and less than a low angular threshold.

Example 18. The method of example 16, in which reporting the fold state of the foldable mobile device based on the measure of the predetermined feature includes reporting the fold state as open in response to the fold angle being greater than a low angular threshold greater than zero.

Example 19. The method of any of examples 12-18, in which the predetermined feature is not visible to the naked eye.

Example 20. The method of any of examples 12-19, in which measuring the predetermined feature includes measuring a first predetermined feature for a first range of fold angles between the first and second faces and measuring a second predetermined feature for a second range of fold angles between the first and second faces.

Example 21. The method of any of examples 12-20, further including measuring another predetermined feature on a third face of the foldable mobile device, in which reporting the fold state of the foldable mobile device is based on at least one of a measure of the predetermined feature or a measure of the other predetermined feature.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A foldable mobile device, comprising:
    a first face;
    a second face;
    a hinge coupling the first and second faces and configured to fold the foldable mobile device into one or more fold states,
    an image sensor disposed on the first face; and
    a processor coupled to the first face, the second face and the image sensor, wherein the processor is configured to:
        generate a predetermined feature on a display on the second face;
        measure by the image sensor the predetermined feature on the second face; and
        report a fold state of the foldable mobile device based on the measure of the predetermined feature.

2. The foldable mobile device of claim 1, wherein the processor is further configured to base the reported fold state on a dimension determined from the measure of the predetermined feature.

3. The foldable mobile device of claim 1, wherein the predetermined feature is an element on a status bar of a display on the second face.

4. The foldable mobile device of claim 1, wherein the processor is further configured to identify a fold angle between the first and second faces based on the measure of the predetermined feature.

5. The foldable mobile device of claim 4, wherein the processor is further configured to report the fold state as ajar in response to the fold angle being greater than zero and less than a low angular threshold.

6. The foldable mobile device of claim 4, wherein the processor is further configured to report the fold state as open in response to the fold angle being greater than a low angular threshold greater than zero.

7. The foldable mobile device of claim 1, wherein the predetermined feature is not visible to the naked eye.

8. The foldable mobile device of claim 1, wherein the processor is further configured to measure the predetermined feature by measuring a first predetermined feature for a first range of fold angles between the first and second faces and measuring a second predetermined feature for a second range of fold angles between the first and second faces.

9. The foldable mobile device of claim 1, wherein the processor is further configured to:
  measure another predetermined feature on a third face of the foldable mobile device; and
  report the fold state of the foldable mobile device based on at least one of a measure of the predetermined feature or a measure of the other predetermined feature.

10. A method of detecting a fold state of a foldable mobile device, comprising:
  generating a predetermined feature on a display of the foldable mobile device, wherein the foldable mobile device includes a first face and a second face, wherein the display is disposed on at least the second face;
  measuring, using an image sensor disposed on the first face of the foldable mobile device, the generated predetermined feature, wherein the foldable mobile device includes a hinge coupling the first and second faces pivotally to fold into one or more fold states, wherein the fold states include a closed state in which the first and second faces face one another and an open state in which the first and second faces at least partially face away from one another; and
  reporting, by a processor of the foldable mobile device, a fold state of the foldable mobile device based on the measure of the predetermined feature.

11. The method of claim 10, wherein the reported fold state is based on a dimension determined from the measure of the predetermined feature.

12. The method of claim 10, wherein the predetermined feature is an element on a status bar of a display on the second face.

13. The method of claim 10, wherein a measure of the predetermined feature determined from the measuring thereof corresponds to a fold angle between the first and second faces.

14. The method of claim 13, wherein reporting the fold state of the foldable mobile device based on the measure of the predetermined feature comprises reporting the fold state as ajar in response to the fold angle being greater than zero and less than a low angular threshold.

15. The method of claim 13, wherein reporting the fold state of the foldable mobile device based on the measure of the predetermined feature comprises reporting the fold state as open in response to the fold angle being greater than a low angular threshold greater than zero.

16. The method of claim 10, wherein the predetermined feature is not visible to the naked eye.

17. The method of claim 10, wherein measuring the predetermined feature comprises measuring a first predetermined feature for a first range of fold angles between the first and second faces and measuring a second predetermined feature for a second range of fold angles between the first and second faces.

18. The method of claim 10, further comprising measuring another predetermined feature on a third face of the foldable mobile device, wherein reporting the fold state of the foldable mobile device is based on at least one of a measure of the predetermined feature or a measure of the other predetermined feature.

19. A foldable mobile device, comprising:
  a first face;
  a second face;
  a hinge coupling the first and second faces and configured to fold the foldable mobile device into one or more fold states,
  means for generating a predetermined feature on a display on the second face;
  means for measuring the predetermined feature on the second face; and
  means for reporting a fold state of the foldable mobile device based on the measure of the predetermined feature.

20. The foldable mobile device of claim 19, wherein means for reporting a fold state of the foldable mobile device based on the measure of the predetermined feature comprises means for reporting the fold state based on a dimension determined from the measure of the predetermined feature.

21. The foldable mobile device of claim 19, wherein the predetermined feature is an element on a status bar of a display on the second face.

22. The foldable mobile device of claim 19, wherein a measure of the predetermined feature determined from the measuring thereof corresponds to a fold angle between the first and second faces.

23. The foldable mobile device of claim 22, wherein means for reporting the fold state of the foldable mobile device based on the measure of the predetermined feature comprises means for reporting the fold state as ajar in response to the fold angle being greater than zero and less than a low angular threshold.

24. The foldable mobile device of claim 22, wherein means for reporting the fold state of the foldable mobile device based on the measure of the predetermined feature comprises means for reporting the fold state as open in response to the fold angle being greater than a low angular threshold greater than zero.

25. The foldable mobile device of claim 19, wherein the predetermined feature is not visible to the naked eye.

26. The foldable mobile device of claim 19, wherein means for measuring the predetermined feature comprises means for measuring a first predetermined feature for a first range of fold angles between the first and second faces and measuring a second predetermined feature for a second range of fold angles between the first and second faces.

27. The foldable mobile device of claim 19, further comprising means for measuring another predetermined feature on a third face of the foldable mobile device, wherein means for reporting the fold state of the foldable mobile device comprises means for reporting the fold state of the foldable mobile device based on at least one of a measure of the predetermined feature or a measure of the other predetermined feature.

* * * * *